United States Patent
Hohm et al.

(10) Patent No.: US 10,782,722 B2
(45) Date of Patent: Sep. 22, 2020

(54) SYSTEM AND METHOD FOR INTERACTIVE DEMAND RESPONSE FOR CONTROLLING AND ROUTING POWER TO ONE OR MORE IRRIGATION SYSTEMS

(71) Applicants: Jesse Hohm, Huron, SD (US); Michael D. Meyer, Huron, SD (US)

(72) Inventors: Jesse Hohm, Huron, SD (US); Michael D. Meyer, Huron, SD (US)

(73) Assignee: Valmont Industries, Inc., Omaha, NE (US)

( * ) Notice: Subject to any disclaimer, the term of this patent is extended or adjusted under 35 U.S.C. 154(b) by 123 days.

(21) Appl. No.: 15/971,463

(22) Filed: May 4, 2018

(65) Prior Publication Data

US 2018/0329442 A1 Nov. 15, 2018

Related U.S. Application Data

(60) Provisional application No. 62/505,215, filed on May 12, 2017.

(51) Int. Cl.
| | |
|---|---|
| *H02J 3/14* | (2006.01) |
| *G05F 1/66* | (2006.01) |
| *H04L 29/08* | (2006.01) |
| *G08C 17/02* | (2006.01) |
| *A01G 25/16* | (2006.01) |

(52) U.S. Cl.
CPC .............. *G05F 1/66* (2013.01); *H04L 67/125* (2013.01); *A01G 25/16* (2013.01); *G08C 17/02* (2013.01)

(58) Field of Classification Search
CPC ....................................................... H02J 3/14

USPC .......................................................... 700/295
See application file for complete search history.

(56) References Cited

U.S. PATENT DOCUMENTS

| | | | | |
|---|---|---|---|---|
| 5,740,038 | A * | 4/1998 | Hergert | A01G 25/092 700/284 |
| 7,280,892 | B2 * | 10/2007 | Bavel | A01G 7/00 239/69 |
| 7,574,286 | B2 * | 8/2009 | Hergert | H02J 3/14 700/286 |
| 8,068,938 | B2 | 11/2011 | Fujita | |
| 8,744,638 | B2 | 6/2014 | Tyagi et al. | |

(Continued)

Primary Examiner — Suresh Suryawanshi
(74) Attorney, Agent, or Firm — Milligan PC LLO

(57) ABSTRACT

The present invention provides an interactive demand response system for controlling and routing power to one or more irrigation systems. According to a preferred embodiment of the present invention, a system is provided which includes a power station load control CPU and a terminal interface module to allow growers to sign up for and selectively override load control events via any web-connected computer, tablet, or smartphone. Further, the present invention preferably generates automated text and email alerts for upcoming load control events including the start and end times for each event. Further, the present invention may provide for displays of current system demand within groups of load control devices before, during, and after load control events. Further the system of the present invention preferably includes the creation and transmission of messages and reports which provide a recap for the power company and/or the growers and which detail the level of participation, power usage, timing of load control events, and the selection of overrides.

9 Claims, 2 Drawing Sheets

(56) References Cited

U.S. PATENT DOCUMENTS

| | | | |
|---|---|---|---|
| 8,996,419 B2 | 3/2015 | Forbes, Jr. | |
| 9,014,864 B2 | 4/2015 | Najewicz et al. | |
| 9,943,047 B2* | 4/2018 | Carlson | A01G 25/16 |
| 2002/0117214 A1* | 8/2002 | Tucker | G05D 16/2053 |
| | | | 137/487.5 |
| 2003/0182022 A1* | 9/2003 | Addink | A01G 25/16 |
| | | | 700/284 |
| 2007/0043478 A1 | 2/2007 | Ehlers et al. | |
| 2007/0043480 A1 | 2/2007 | Hergert | |
| 2009/0099701 A1 | 4/2009 | Li et al. | |
| 2009/0281672 A1 | 11/2009 | Pourzia | |
| 2010/0138363 A1 | 6/2010 | Batterberry et al. | |
| 2011/0015797 A1 | 1/2011 | Gilstrap | |
| 2011/0087379 A1 | 4/2011 | Savelle, Jr. et al. | |
| 2011/0190947 A1* | 8/2011 | Savelle, Jr. | G05D 11/02 |
| | | | 700/284 |
| 2012/0179302 A1 | 7/2012 | Vadali et al. | |
| 2013/0253713 A1 | 9/2013 | VanWagoner et al. | |
| 2014/0088771 A1 | 3/2014 | Woytowitz et al. | |
| 2014/0371928 A1* | 12/2014 | Ersavas | A01G 25/167 |
| | | | 700/284 |
| 2015/0100172 A1 | 4/2015 | Forbes, Jr. | |
| 2015/0127185 A1 | 5/2015 | Behrangrad | |
| 2015/0147119 A1* | 5/2015 | Christiansen | A01G 25/167 |
| | | | 405/37 |
| 2015/0301547 A1 | 10/2015 | Johansson | |
| 2016/0202679 A1* | 7/2016 | Bermudez Rodriguez | G05B 19/042 |
| | | | 700/284 |
| 2016/0209822 A1 | 7/2016 | Pulliam et al. | |
| 2016/0285550 A1 | 9/2016 | Economy | |
| 2018/0189899 A1* | 7/2018 | Meyn | H02J 3/14 |

\* cited by examiner

SYSTEM AND METHOD FOR INTERACTIVE DEMAND RESPONSE FOR CONTROLLING AND ROUTING POWER TO ONE OR MORE IRRIGATION SYSTEMS

RELATED APPLICATIONS

The present application claims priority to U.S. Provisional Application No. 62/505,215 filed May 12, 2017.

BACKGROUND AND FIELD OF THE PRESENT INVENTION

1. Field of the Present Invention

The present invention relates generally to a system and method for providing interactive demand response in energy generation and routing and more particularly, to a system and method for providing an interactive demand response system for controlling and routing power to one or more irrigation systems.

2. Background of the Invention

Demand response is a forced reduction in the power consumption of an electric utility customer to better match the demand for power with the supply. Demand response is used by power companies to reduce the load on their systems. This is generally accomplished by remote management of a control box and a local load control switch that is wired into electrical systems of equipment to enable shutting down equipment during periods of peak demand. Most load control switches consist of a communication module and a relay switch. Such switches generally operate similarly to a pager, receiving signals or an electrical frequency shift to turn off or reduce power to an appliance during tunes of peak electrical demand.

Within conventional demand response systems, a customer's options are limited to either adjusting power demand by postponing some tasks that require large amounts of electric power, or paying a higher price for their electricity. If properly equipped, some customers may also switch part of their consumption to alternate sources, such as on-site diesel generators.

Regardless of how they are setup, current demand response systems do not allow customers to dynamically tailor their power consumption based on rapid fluctuations in temperature or other factors. This limitation is particularly important to farm operations which consume large amounts of electricity within very concentrated windows of time. It is even more important to irrigation systems since the timing of irrigation events carry direct economic consequences for any changes to prescribed schedules.

SUMMARY OF THE PRESENT INVENTION

To address the shortcomings presented in the prior art, the present invention provides an interactive demand response system for controlling and routing power to one or more systems including irrigation systems. According to a preferred embodiment of the present invention, a system is provided which includes a power station load control CPU and a terminal interface module to allow growers to sign up for and selectively override load control events via any web-connected computer, tablet, or smartphone. Further, the present invention preferably generates automated text and email alerts for upcoming load control events including the start and end times for each event. Further, the present invention may provide for displays of current system demand within groups of load control devices before, during, and after load control events. Further the system of the present invention preferably includes the creation and transmission of messages and reports which provide a recap for the power company and/or the growers and which detail the level of participation, power usage, timing of load control events, and the selection of overrides.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
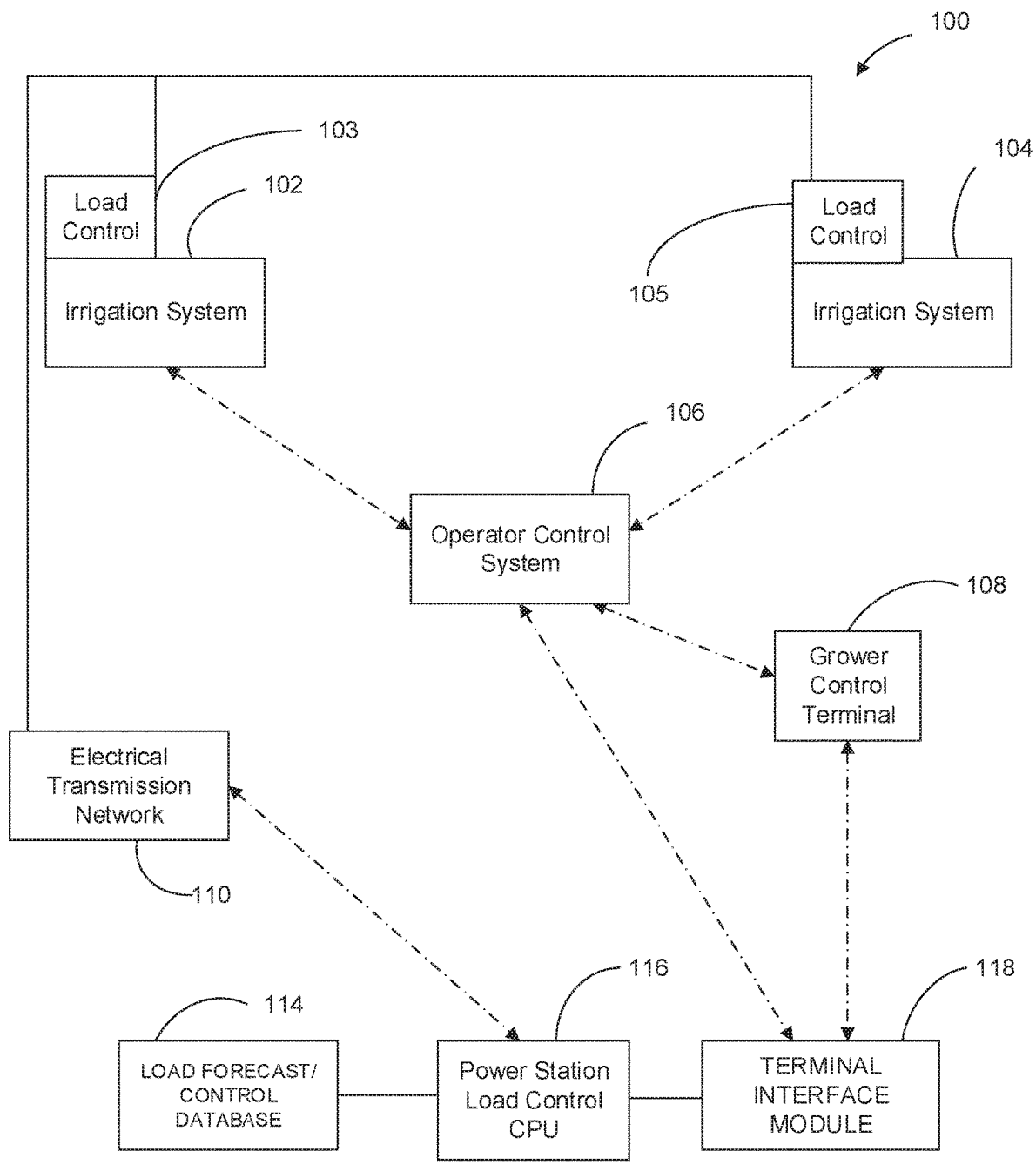
FIG. 1 shows a block diagram in accordance with an embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

Various inventive features are described below which can be used independently of one another or in combination with other features. However, any single inventive feature may not address any of the problems discussed above or only address one of the problems discussed above. Further, one or more of the problems discussed above may not be fully addressed by any of the features described below.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code such as R, Python and/or Excel. Further, the present invention teaches the use of processors to perform the functionalities and processes described herein.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

The terms "computer," "engine," "module," "processor" and the like should be understood to be synonymous for the purposes of this disclosure. Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

The terms "power company," "power provider" and the like should be understood to be synonymous for the purposes of this disclosure. These terms should be understood to generically refer to any system or mechanism for providing power to an end user.

Reference is now made in detail to the exemplary embodiments of the invention, examples of which are illustrated in the accompanying drawings. Wherever possible, the same reference numbers will be used throughout the drawings to refer to the same or like parts. It should be understood that throughout this disclosure, unless logically required to be otherwise, where a process or method is shown or described, the steps of the method may be performed in any order or simultaneously. As used throughout this application, the word "may" is used in a permissive sense (i.e., meaning "having the potential to"), rather than the mandatory sense (i.e. meaning "must").

With reference now to FIG. 1, a block diagram in accordance with an embodiment of the present invention will now be discussed. As shown in FIG. 1, the present invention provides a power transmission control system 100 which includes an electrical transmission network 110 which provides power to a plurality of irrigation systems 102, 104, As further shown, a central control CPU 116 is preferably provided which monitors the electrical transmission network 110 and controls the on/off status of the plurality of irrigation systems 102, 104 through the use of load control switches 103, 105 respectively. Although irrigation systems are discussed in this example, it should be understood that the present invention may be used for load control for any appliance, machine or other electricity consuming entity.

As shown, CPU 116 preferably includes a control-decision module which preferably includes software code running on a processor within or connected to the CPU 116. In operation, the load control CPU 116 is preferably in communication with a load forecast/database module 114 which stores and updates the predicted loads for upcoming time periods. Preferably, the load forecast module 114 is further in communication with a remote updating service or the like so that the best and most accurate data may be available to the load control CPU 116.

With the data from the load forecast module 114, the load control CPU 116 preferably may determine one or more periods of peak load. Depending on the data available, the load control CPU 116 may simply receive a peak pre-identified period of peak load or may independently calculate the peak load periods based on one or more data sets. In some cases, utility personnel may simply consider the forecasted temperature and prior system behavior to determine system load. Further, the load control CPU 116 may receive and/or calculate the precise peak load time period for either an entire network system or for only a portion of the system. In this way, the system may treat discrete portions of a network system separately for the purpose of calculating peak load periods.

In addition to the load forecast module 114, the load control CPU 116 may preferably further interface with a terminal interface module 118. According to a preferred embodiment, the terminal interface module 118 preferably may be an operator accessible web or portal interface which allows communication with clients and operators. For example, the terminal interface module 118 preferably may allow operators to log on and determine load control schedules for a given set of systems. Further, the terminal interface module 118 preferably may allow operators to set up and access selections regarding their participation in the load control program and to access power saving calculations.

As further shown in FIG. 1, an exemplary operator control system 106 is shown which preferably allows an operator to control and monitor the operations of one or more irrigation systems 102, 104. According to a still further preferred embodiment, the system of the present invention may preferably further include a grower control terminal 108 which allows for remote operation and monitoring of the operator control system 106. According to a further preferred embodiment, the grower control terminal 108 may preferably include a computer, tablet and/or a smartphone type of device which allows for communications with the operator control system 106 as well as the terminal interface module 118. According to a further preferred embodiment, the terminal interface module 118 may communication and receive information directly from either the operator control system 106 and/or the grower control terminal 108.

Figure 2:
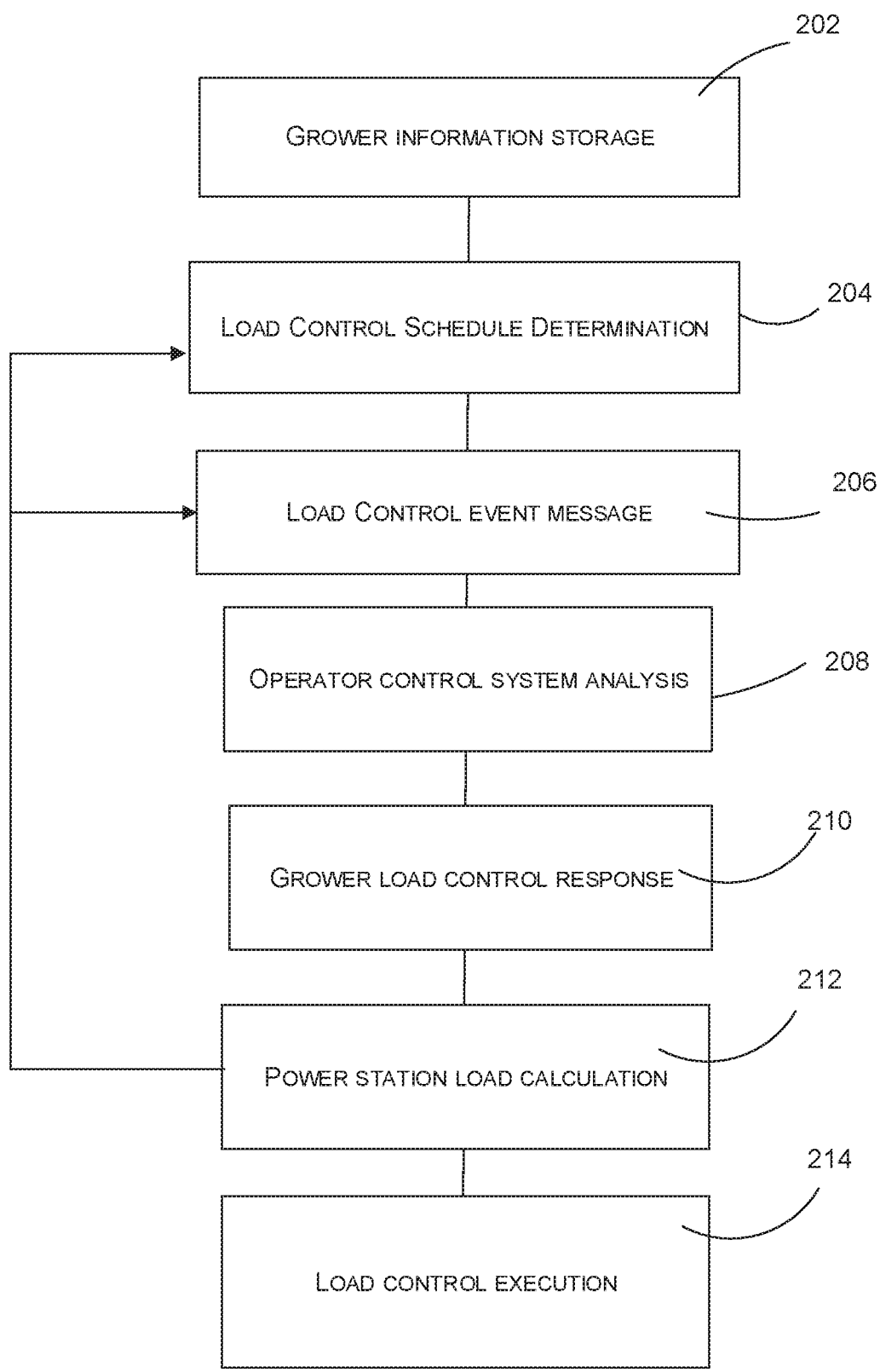
FIG. 2 illustrates a method for use with one or more embodiments of the present invention.

With reference now to FIGS. 1 and 2, an exemplary method in accordance with a further preferred embodiment of the present invention shall now be discussed. As shown in FIG. 2, an exemplary first step 202 of the present invention preferably includes storing irrigation system information for a given grower. This information preferably includes a listing for each irrigation system used by grower/operators and the power draw/load information for each piece of equipment under load control. Preferably, this information may be variously stored for access by the load control CPU 116 and the operator control system 106. With the load information stored, the load control CPU 116 in the next step 204 may preferably then calculate and maintain a load control schedule determination. Preferably, this load control schedule will include a calculation of the desired run periods for each irrigation system 102, 104. At step 206, the load control CPU 116 preferably initiates a load control event message to the grower/operator which provides the dates and times of upcoming load control events. Preferably, the messages may be initiated at any scheduled time and they may further be initiated to occur at any given time interval prior to a load control event occurring (i.e. 30 minutes prior to the load control event). At step 208, the time and duration of the load control is preferably received by the grower via the grower control terminal 108 and/or the operator control system 106. According to a preferred aspect of the present invention, the operator control system 106 may preferably perform a calculation comparing the increased electricity cost of overriding the scheduled load control event with one or more factors affecting the crop growth. These may include: growth stage of crop; heat; humidity; soil composition; weather forecasts and the like. Preferably, the operator control system 106 may then preferably provide a comparison of the cost and benefits of overriding the load control event and provide the analysis to the grower control terminal 108 for the grower's review and analysis. Based on the grower's decision, in step 210 the grower may preferably opt to override the load control event and instead allow a given irrigation system to operate. Further, the grower may choose to allow the load control event to occur so that the irrigation systems 102 and 104 may be shut off or without power.

According to a further preferred embodiment, the grower may also elect to override a load control event for first system 102 based on growth data while allowing a second system to be subject to the load control event. For any response, the grower preferably may communicate through the grower control terminal 108 to the load control CPU 116 via the terminal interface module 118. According to a further preferred embodiment, growers may preferably remotely override a load control event from anywhere using an internet or cellular data connection and a computer, tablet or smartphone as a grower control terminal 108.

At step 212, the load control CPU 116 preferably receives the load control responses for each system in the electrical transmission network 110 and uses the responses to update its load calculations for the load control event. According to a preferred embodiment, if the load calculation changes the price and/or the duration of the load control event, the load control CPU 116 may reset the schedule again (step 204) and/or retransmit an updated load control event message (step 206) with the updated calculations. For example, the load control CPU 116 may transmit any increase/decrease in the cost or duration of a load control event. Thereafter, the grower's system may proceed to update its calculations (step 208) and the grower may transmit a new or updated response (step 210). For example, based on a high number of growers opting out of a load control event, the cost of opting out may necessarily need to be increased. According to a further preferred embodiment, further incentives may also be provided to growers for not opting out of a given load control event, with the incentives increasing depending on factors such as: increased power demand, low grower participation in load control; and/or a high percent of growers opting out of a particular load control event.

At step 214, with all of the grower choices determined, the load control CPU 116 will then preferably execute the load control event. In according with further aspects of the present invention, the load control CPU 116 preferably allows power producers to group enrolled units and observe in near real-time the number of units that are running and the amount of actual load that can be dropped from their system. According to further aspects of the present event, when a load control event is initiated, the users may preferably be notified within a very short time period (i.e., 5 to 30 seconds). Further, the system may preferably provide notices for events that are scheduled in the future, as well as the start and end of initiated load control events.

As discussed above, according to a preferred embodiment of the present invention, a power provider may use the power station load control CPU 116 and terminal interface module 118 of the present invention to allow growers to sign up for and selectively override load control events via any web-connected computer, tablet, or smartphone. Further, the present invention may preferably generate automated text and email alerts for upcoming load control events including the start and end times for each event. Further, the present invention may provide for displays of current system demand within groups of load control devices before, during, and after load control events. Further the system of the present invention preferably includes the creation and transmission of messages and reports which provide a recap for the power company including for example: levels of participation, power usage, timing of load control events, and selection of overrides.

While the above descriptions regarding the present invention contain much specificity, these should not be construed as limitations on the scope, but rather as examples. Many other variations are possible. For example, the present system may be used with other power consuming systems unrelated to irrigation such as those in mining, manufacturing, construction and the like without limitation. Further, the present invention may be used with groups of systems as well as individual systems. Accordingly, the scope should be determined not by the embodiments illustrated, but by the appended claims and their legal equivalents.

What is claimed is:

1. A method of providing an interactive demand response system for controlling and routing power to one or more irrigation systems, the method comprising:
   storing irrigation system information for a given grower, wherein the stored information comprises load information for each piece of equipment under load control for the grower;
   calculating a load control schedule, wherein the load control schedule c arises a calculation of the desired run periods for a plurality of irrigation systems;
   initiating a load control event message, wherein the load control event message comprises notification of the dates and time of upcoming load control events;
   receiving the scheduled time and duration of the load control event at a grower control terminal;
   calculating and comparing the increased electricity cost of opting out of the scheduled load control event based at least in part on the growth stage of a given crop;
   opting out of the load control event and allowing a given irrigation system to operate during the scheduled load control event;
   transmitting changes in the price or the duration of the load control event to the grower;
   receiving a first set of data indicating the number of growers opting out of the load control event;
   updating the increased electricity cost of overriding the scheduled load control event based on the number of growers opting out of the load control event; and
   opting back into a load control event based on the updated increased electricity cost.

2. The method of claim 1, wherein the method further comprises:
   calculating an incentive for growers to opt into a load control event; wherein the incentive is increased based on an increased power demand; wherein the incentive is increased if more than a given percentage of growers opt out of a load control event; and transmitting the increased incentive to a first set of growers.

3. A system for controlling and routing power to one or more irrigation systems via a power transmission control system which feeds power to the irrigation systems via an electrical transmission network, wherein the system comprises:

a first irrigation system, wherein the first irrigation system comprises a first irrigation machine which operates using power supplied by the electrical transmission network;

a second irrigation system, wherein the second irrigation system comprises a second irrigation machine which operates using power supplied by the electrical transmission network;

a first power load control switch, wherein the first power load control switch operates in a first ON state which allows electricity to flow into the first irrigation system and a second OFF state which restricts electricity from flowing into the first irrigation system;

a second power load control switch, wherein the second power load control switch operates in a first ON state which allows electricity to flow into the second irrigation system and a second OFF state which restricts electricity from flowing into the second irrigation system;

an operator power control unit, wherein the operator power control unit controls the ON and OFF states of the first power load control switch and the second power load control switch; further wherein the operator power control unit monitors the transmission of electricity to the first irrigation system and to the second irrigation system; further wherein the operator power control unit is comprised of an internet appliance which is configured to interface with the power station load control processing unit;

a load control database, wherein the load control database stores and updates predicted loads for upcoming time periods; further wherein the load control database receives updates from a plurality of remote data sources;

a power station load control processing unit; wherein the power station load control processing unit receives forecast data from the load control database; wherein the power station load control processing unit is programmed to execute load control events;

a terminal interface module, wherein the terminal interface module comprises a web-interface appliance which allows data and instructions from the power station load control processing unit to be accessed; and a grower control terminal, wherein the grower control terminal is comprised of an internet appliance which is configured to interface with the power station load control processing unit and the operator power control unit;

wherein the operator power control unit is programmed to allow the operator to authorize the power station load control processing unit to control the first and second load control switches; wherein the grower control terminal is programmed to allow the operator to schedule times for the load control processing unit to control the first and second load control switches; wherein the power station load control processing unit is programmed to calculate peak load time periods for the electrical transmission network; wherein the operator power control unit stores irrigation system information for the first irrigation system and the second irrigation system;

wherein the power station load control processing unit is programmed to calculate and maintain a load control schedule comprising a calculation of the desired load control events for the first irrigation system and the second irrigation system; wherein the power station load control processing unit is programmed to transmit a load control event message to the operator power control unit which provides the dates and times of upcoming load control events to the operator power control unit;

wherein the operator power control unit is programmed to perform a calculation comparing the increased electricity cost of overriding the scheduled load control event based at least in part on the growth stage of a given crop.

4. The system of claim 3, wherein the operator power control unit is programmed to allow the operator to override a scheduled load control event and to transmit the override message to the power station load control processing unit.

5. The system of claim 4, wherein the power station load control processing unit is programmed to update the load calculations for the load control event based on one or more operator override messages; further wherein the power station is programmed to recalculate the cost of overriding one or more load control events.

6. The system of claim 5, wherein the power station load control processing unit is programmed to change the dates and times of upcoming load control events based on one or more operator override messages.

7. The system of claim 6, wherein the power station load control processing unit is programmed to transmit data indicating changes in the cost of overriding a load control event.

8. The system of claim 7, wherein the power station load control processing unit is programmed to transmit adjusted pricing based on the number of operators overriding a load control event.

9. The system of claim 8, wherein the power station load control processing unit is programmed to calculate an incentive for an operator to not override a load control event; wherein the incentive is increased based on an increased power demand; wherein the incentive is increased if more than a given percentage of operators opt out of a load control event.

* * * * *